US006312336B1

(12) United States Patent
Handelman et al.

(10) Patent No.: US 6,312,336 B1
(45) Date of Patent: Nov. 6, 2001

(54) ELECTRONIC GAME GUIDE SYSTEM

(75) Inventors: Doron Handelman, Givatayim; David Zviel, Efrat, both of (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 09/244,198

(22) Filed: Feb. 4, 1999

(30) Foreign Application Priority Data

Feb. 13, 1998 (IL) ...................................................... 123288

(51) Int. Cl.[7] ........................................................ G06F 19/00
(52) U.S. Cl. ...................................... 463/40; 463/42; 463/1; 463/43; 725/39; 725/40; 725/43; 725/45; 725/51; 725/53
(58) Field of Search .................................. 463/1, 29, 30, 463/31, 40, 41, 42, 43, 47; 348/119, 906; 273/148 B; 725/56, 39, 40, 43, 45, 48, 51, 53

(56) References Cited

U.S. PATENT DOCUMENTS

| 4,163,254 | 7/1979 | Block et al. ........................ 358/122 |
| 4,225,884 | 9/1980 | Block et al. ........................ 358/122 |
| 4,264,924 | 4/1981 | Freeman ............................. 358/86 |
| 4,264,925 | 4/1981 | Freeman et al. ..................... 358/86 |
| 4,528,589 | 7/1985 | Block et al. ........................ 358/122 |
| 4,567,516 | 1/1986 | Scherer et al. ..................... 358/114 |
| 4,602,279 | 7/1986 | Freeman ............................. 358/86 |
| 4,706,121 | 11/1987 | Young ............................... 358/142 |
| 4,795,497 | 1/1989 | McConnell et al. .................. 134/18 |
| 4,823,385 | 4/1989 | Hegendorfer ........................ 380/10 |
| 4,977,455 | 12/1990 | Young ............................... 358/142 |
| 4,989,245 | 1/1991 | Bennett ............................. 380/23 |
| 5,020,129 | 5/1991 | Martin et al. ...................... 455/4 |
| 5,033,085 | 7/1991 | Rew ................................. 380/20 |
| 5,036,537 | 7/1991 | Jeffers et al. ..................... 380/20 |
| 5,051,822 | 9/1991 | Rhoades ............................. 358/86 |
| 5,060,079 | 10/1991 | Rufus-Isaacs ....................... 358/84 |
| 5,151,789 | 9/1992 | Young .............................. 358/194.1 |
| 5,181,107 | 1/1993 | Rhoades ............................. 358/86 |
| 5,282,249 | 1/1994 | Cohen et al. ........................ 380/23 |
| 5,353,121 | 10/1994 | Young et al. ....................... 348/563 |
| 5,393,057 | 2/1995 | Marnell, II ......................... 273/85 |
| 5,459,222 | 10/1995 | Pint ................................ 348/478 |
| 5,465,113 | 11/1995 | Gilboy ............................. 348/5.5 |
| 5,473,609 | 12/1995 | Chaney ............................. 370/94.1 |
| 5,479,266 | 12/1995 | Young et al. ....................... 358/335 |
| 5,479,268 | 12/1995 | Young et al. ....................... 358/335 |
| 5,481,609 | 1/1996 | Cohen et al. ........................ 380/16 |
| 5,515,106 | 5/1996 | Chaney et al. ...................... 348/461 |
| 5,532,754 | 7/1996 | Young et al. ....................... 348/569 |
| 5,539,449 | 7/1996 | Blahut et al. ....................... 348/7 |
| 5,539,450 | 7/1996 | Handelman ......................... 348/12 |
| 5,541,738 | 7/1996 | Mankovitz ......................... 358/335 |
| 5,559,548 | 9/1996 | Davis et al. ........................ 348/6 |
| 5,575,717 | * 11/1996 | Houriet, Jr. et al. ................ 463/1 |

(List continued on next page.)

FOREIGN PATENT DOCUMENTS

| 0355957 A2 | 2/1990 | (EP) | .............................. H04N/5/445 |
| 0409562 A2 | 1/1991 | (EP) | .............................. H04N/5/45 |
| 0461910 A2 | 12/1991 | (EP) | .............................. A63F/9/22 |
| 662769 | 7/1995 | (EP) . | |
| 97/33434 | 9/1997 | (WO) | .............................. H04N/7/00 |
| 99/01984 | 1/1999 | (WO) | .............................. H04N/7/173 |
| 0001149 | 7/2000 | (WO) . | |

Primary Examiner—Joe H. Cheng
Assistant Examiner—Julie Kasick
(74) Attorney, Agent, or Firm—Ladas & Parry

(57) ABSTRACT

A gaming guide method including providing first gaming guide information from a television network and second gaming guide information from a computer based communication network, and displaying simultaneously at least a portion of the first gaming guide information and at least a portion of the second gaming guide information.

Related apparatus and methods are also described.

32 Claims, 8 Drawing Sheets

U.S. PATENT DOCUMENTS

| | | | |
|---|---|---|---|
| 5,581,270 | 12/1996 | Smith et al. | 345/2 |
| 5,585,838 | 12/1996 | Lawler et al. | 348/13 |
| 5,585,858 | 12/1996 | Harper et al. | 348/485 |
| 5,589,892 | 12/1996 | Knee et al. | 348/731 |
| 5,592,212 | 1/1997 | Handelman | 348/12 |
| 5,629,733 | 5/1997 | Youman et al. | 348/7 |
| 5,630,119 | 5/1997 | Aristides et al. | 395/601 |
| 5,635,978 | 6/1997 | Alten et al. | 348/7 |
| 5,657,072 | 8/1997 | Aristides et al. | 348/13 |
| 5,666,412 | 9/1997 | Handelman et al. | 380/4 |
| 5,666,645 | 9/1997 | Thomas et al. | 455/6.1 |
| 5,684,525 | 11/1997 | Klosterman | 348/12 |
| 5,734,786 | 3/1998 | Mankovitz | 386/96 |
| 5,745,895 | 4/1998 | Bingham et al. | 707/10 |
| 5,760,821 | 6/1998 | Ellis et al. | 348/10 |
| 5,767,894 | 6/1998 | Fuller et al. | 348/8 |
| 5,774,546 | 6/1998 | Handelman et al. | 380/4 |
| 5,784,095 | 7/1998 | Robbins et al. | 348/6 |
| 5,784,763 | 7/1998 | Cassidy | 24/130 |
| 5,790,201 | 8/1998 | Antos | 348/552 |
| 5,805,763 | 9/1998 | Lawler et al. | 386/83 |
| 5,832,471 | 11/1998 | Fukui | 707/1 |
| 5,940,073 * | 8/1999 | Klosterman et al. | 345/327 |
| 5,978,043 * | 11/1999 | Blonstein et al. | 348/569 |
| 6,005,565 * | 12/1999 | Legall et al. | 345/327 |
| 6,005,938 | 12/1999 | Banker et al. | 380/20 |
| 6,025,837 | 2/2000 | Matthews, III et al. | 345/327 |
| 6,061,503 | 5/2000 | Chamberlain | 395/200.47 |
| 6,114,376 * | 11/2000 | Connelly | 345/327 |
| 6,118,443 * | 9/2000 | Allison et al. | 345/327 |
| 6,144,991 | 11/2000 | England | 709/205 |
| 6,151,059 * | 11/2000 | Scheinet et al. | 348/13 |
| 6,163,316 | 12/2000 | Killian | 345/327 |

* cited by examiner

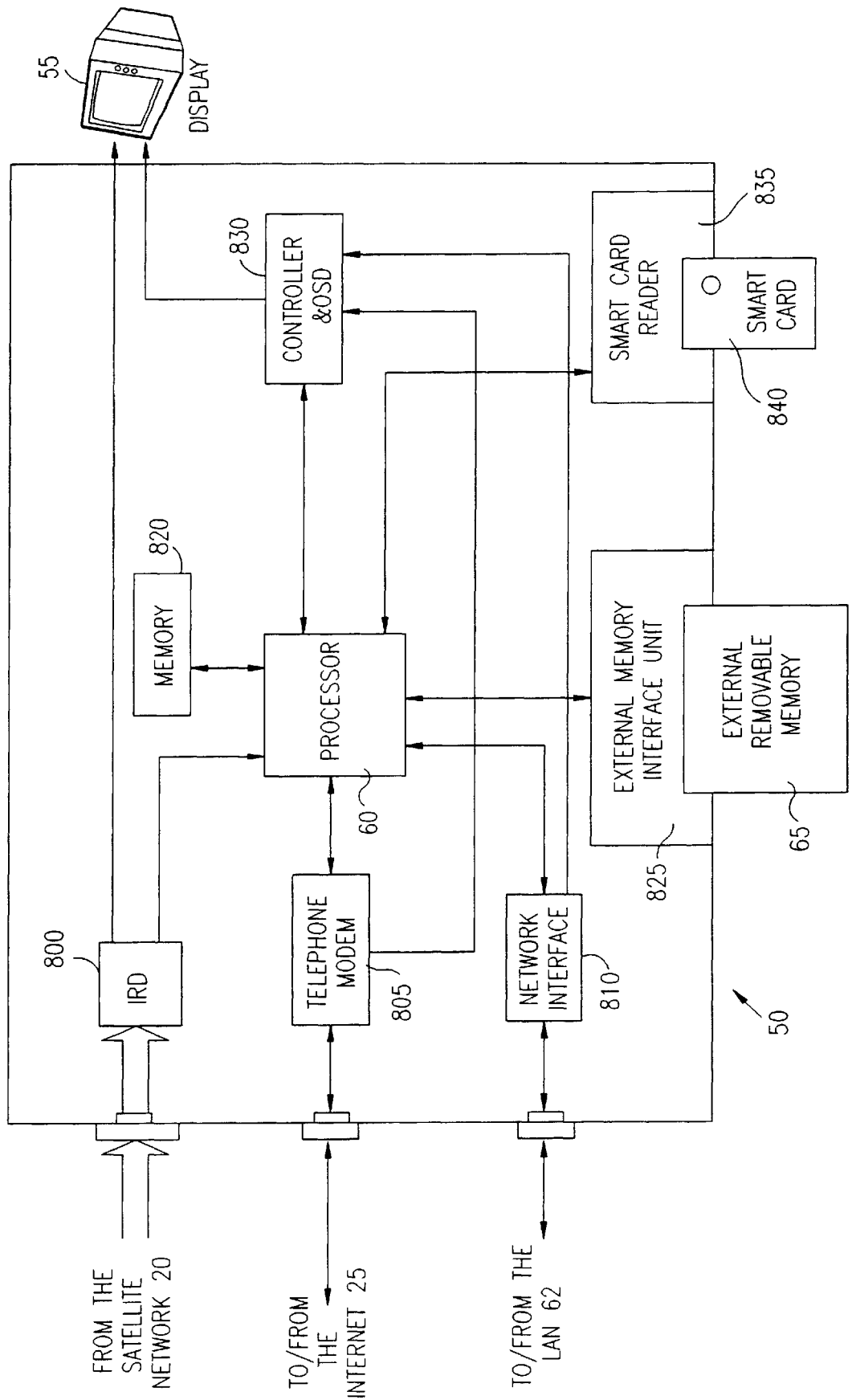

ELECTRONIC GAME GUIDE SYSTEM

FIELD OF THE INVENTION

The present invention relates to gaming systems generally and more particularly to gaming guide systems which enable a user to make selections from the gaming guide systems.

BACKGROUND OF THE INVENTION

Electronic program guides which provide television program schedule information are known in the art.

Such electronic program guides are described, for example, in the following U.S. patents assigned to Starsight Telecast Incorporated of Fremont Calif. : U.S. 5,532,754; 5,479,266, 5,479,268, 4,706,121 and 5,353,121. Some program guide systems also allow VCR (Video Cassette Recorder) scheduling such as those described in U.S. Pat. Nos. 4,977,455 and 5,151,789 which are also assigned to Starsight Telecast Incorporated of Fremont Calif.

U.S. Pat. 5,684,525 to Klosterman et al., which is also assigned to Starsight Telecast Incorporated, describes a scheme for merging television schedule information received from multiple sources. A microprocessor mixes and sorts the television schedule information received from the multiple sources, and the schedule information is then displayed in a television schedule guide. A user can select a program by pointing to that program in the displayed schedule information. The system then carries out an automatic switching/tuning such that the required source device is input to the destination device, and a tuner is then tuned to the selected program's channel.

U.S. Pat. Nos. 5,539,450 and 5,592,212 to Handelman describe a pay television gaming system including a pay television network having a multiplicity of subscriber units each including a television, receiving apparatus for receiving gaming inputs from the multiplicity of subscriber units, transmitting apparatus for transmitting to the multiplicity of subscriber units information relating to gaming results and accounting apparatus for settling gaming debts and winnings via the pay television network.

U.S. Pat. No. 5,666,412 to Handelman et al. describes a CATV system including a CATV network and apparatus for transmitting over the CATV network information to a multiplicity of subscriber units, each including a CATV decoder and an IC card reader and writer coupled to the CATV decoder, the IC card reader and writer includes two separate IC card receptacles, such that IC cards inserted into the two separate IC card receptacles are separately accessed by the IC card reader and writer.

U.S. Pat. No. 5,585,838 to Lawler et al. describes a program time guide for an interactive viewing system which allows a user to control the time and channels for which program information is displayed.

Electronic program guides are also described in the following U.S. Pat. Nos. 4,264,924; 4,264925; 4,602,279; 5,051,822; 5,181,107; 5,393,057; 5,459,522; 5,465,113; 5,473,609; 5,515,106; 5,541,738; 5,559,548.

The disclosures of all references mentioned above and throughout the present specification are hereby incorporated herein by reference.

SUMMARY OF THE INVENTION

The present invention seeks to provide communication systems having electronic gaming guides which provide gaming schedule information and access to different types of games.

In the present invention, gaming guides which are available from or provided by disparate information sources may be viewed simultaneously on a display at a user unit, preferably, at separate locations on the display. The disparate information sources may include a headend of a satellite network, an Internet Service Provider, a memory attached to the user unit and other appropriate sources.

At the user unit, information from the disparate sources is linked according to dynamic or pre-determined criteria typically comprising at least one of keywords, logical connections, and rules. Thus, gaming guide information from one of the disparate sources which is viewed at a first location on the display may effect display of related gaming guide information from the other disparate sources at other locations on the display.

The gaming guides from the disparate sources may be combined by a processor at the user unit. When the user performs an operation, such as sorting, the operation is typically performed on all the gaming guides. Thus, access to and operations on the gaming guides are typically unified and enabled via combined menus.

There is thus provided in accordance with a preferred embodiment of the present invention a gaming guide method including:

providing first gaming guide information from a television network and second gaming guide information from a computer based communication network; and displaying simultaneously at least a portion of the first gaming guide information and at least a portion of the second gaming guide information.

Additionally, the displaying step also includes:

displaying the at least a portion of the first gaming guide information and the at least a portion of the second gaming guide information in separate regions on a display.

Preferably, computer based communication network includes at least one of the following: the Internet; a local area network (LAN); a wide area network (WAN); and a commercial interactive communication network.

Preferably, the method also includes the step of combining the at least a portion of the first gaming guide information and the at least a portion of the second gaming guide information to form combined gaming guide information prior to the displaying step, and wherein the displaying step includes displaying the combined gaming guide information.

The method also preferably includes the step of retrieving third gaming guide information from a storage device, and wherein the displaying step includes the step of:

displaying on a display the at least a portion of the first gaming guide information, the at least a portion of the second gaming guide information and at least a portion of the third gaming guide information simultaneously.

Preferably, the method also includes:

performing a selection from the at least a portion of the first gaming guide information and from the at least a portion of the second gaming guide information.

Alternatively or additionally, the method includes:

performing a selection from the at least a portion of the first gaming guide information, from the at least a portion of the second gaming guide information, and from the at least a portion of the third gaming guide information.

Preferably, the first gaming guide information includes a first list of available games, the second guide information includes a second list of available games and the third guide information includes a third list of available games, and the displaying step includes the step of displaying the first list of available games, the second list of available games and the third list of available games in a single menu.

Additionally, the method includes the step of marking at least one favorite game from at least one of the first list, the second list, and the third list.

There is also provided, in accordance with a preferred embodiment of the present invention, a gaming guide method including:

providing data base management software;

providing first gaming guide information from a television network and second gaming guide information from a computer based communication network, the first gaming guide information and the second gaming guide information each being provided in a format acceptable as input by the data base management software; and employing the data base management software to combine the first gaming guide information and the second gaming guide information into a combined gaming guide data base, and to handle interactions between a user and the combined gaming guide data base.

Preferably, the interactions include at least one of the following: information retrieval; information input; and information display.

Further in accordance with a preferred embodiment of the present invention there is provided a gaming control method for controlling participation of a user in a game, the method including:

employing separate environment codes which are associated with separate playing environments, each environment code defining at least one of restrictions and conditions under which the game is played; and enabling the user to participate in the game played in a selected playing environment in response to an input of an environment code associated with the selected playing environment.

Preferably, the environment code includes a combination of at least one of the following codes: a playing table code; a range of bets code; a participation frequency code; a bonus criteria code; a rate code; and a gaming category code.

The enabling step preferably includes enabling the user to participate in the game if a game category corresponds to an unrestricted game, and prompting the user to enter a game category code if the game category corresponds to a restricted game.

Alternatively or additionally, the enabling step also includes allowing the user to participate in the game in response to an input of the game category code if the game category corresponds to the restricted game.

Preferably, the game includes a betting game, and the environment code includes a playing table code which is associated with a table at which the betting game is played.

There is also provided, in accordance with a preferred embodiment of the present invention, a gaming guide method including:

providing to a user interface unit first gaming guide information from a television network and second gaming guide information from a computer based communication network; and linking at least a portion of the first gaming guide information to at least a portion of the second gaming guide information according to at least one of the following: a keyword; a logical connection; and a rule.

Additionally, the method may also include the step of retrieving third gaming guide information from a memory, and wherein the linking step includes the step of:

linking at least a portion of the third gaming guide information to at least one of the at least a portion of the first gaming guide information and at the least a portion of the second gaming guide information according to the at least one of the following: a keyword; a logical connection; and a rule.

Preferably, at least one of the keyword, the logical connection and the rule is pre-determined.

The method also preferably includes:

displaying the at least a portion of the second gaming guide information when the at least a portion of the first gaming guide information is displayed.

Additionally, the method includes:

displaying the at least a portion of the first gaming guide information when the at least a portion of the second gaming guide information is displayed.

Alternatively or additionally, the method also includes:

displaying the at least a portion of the third gaming guide information when the at least a portion of the first gaming guide information and the at least a portion of the second gaming guide information are displayed.

Additionally, the method includes:

displaying the at least a portion of the first gaming guide information and the at least a portion of the second gaming guide information when the at least a portion of the third gaming guide information is displayed.

There is also provided, in accordance with a preferred embodiment of the present invention, a user unit in a gaming guide system in which first gaming guide information is transmitted to the user unit from a television network and second gaming guide information is transmitted to the user unit from a computer based communication network, the user unit including:

a user interface unit operative to receive the first gaming guide information from the television network and the second gaming guide information from the computer based communication network and to prepare the first gaming guide information together with the second gaming guide information in a format suitable for display; and a display operatively associated with the user interface unit and operative to display information received from the user interface unit.

Preferably, the user interface unit is also operative to prepare the first gaming guide information and the second gaming guide information in a format suitable for display in separate regions on the display.

Additionally, the user interface unit also includes a memory, the memory includes third gaming guide information, and the user interface unit is also operative to prepare at least a portion of the third gaming guide information in a format suitable for display together with the at least a portion of the first gaming guide information and the at least a portion of the second gaming guide information.

Further in accordance with a preferred embodiment of the present invention there is provided a gaming guide system including:

a television network;

a computer based communication network; and a multiplicity of user units, each user unit including:

a user interface unit operative to receive first gaming guide information from the television network and second gaming guide information from the computer based communication network and to prepare the first gaming guide information together with second gaming guide information in a format suitable for display; and a display operatively associated with the user interface unit and operative to display information received from the user interface unit.

BRIEF DESCRIPTION OF THE DRAWINGS

The present invention will be understood and appreciated more fully from the following detailed description, taken in conjunction with the drawings in which:

FIG. 3 is a simplified block diagram illustration of a preferred implementation of a user interface unit in the entertainment system of FIG. 1.

DETAILED DESCRIPTION OF PREFERRED EMBODIMENTS

Figure 1:
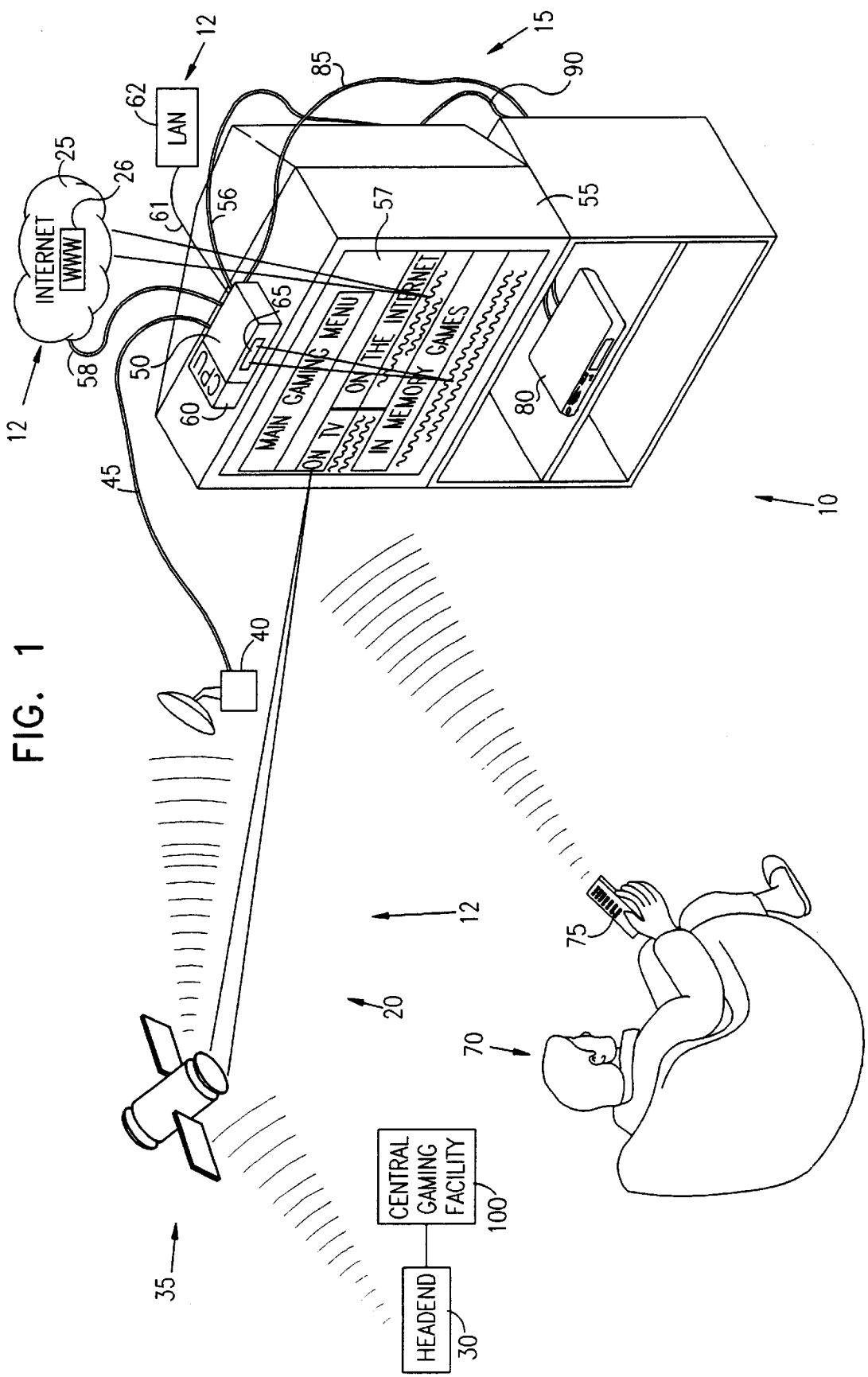
FIG. 1 is a simplified partly pictorial partly block diagram illustration of a preferred implementation of an entertainment system constructed and operative in accordance with a preferred embodiment of the present invention.

Reference is now made to FIG. 1 which is a simplified partly pictorial partly block diagram illustration of a preferred implementation of an entertainment system 10 constructed and operative in accordance with a preferred embodiment of the present invention.

The term "entertainment system" is used throughout the present specification and claims in a broad sense to include mass-media communication systems which provide to a plurality of subscribers at least one of the following: television programming including pay and/or non-pay television programming; multimedia information; audio programs; data; games; and information from computer based networks such as the Internet.

The entertainment system 10 may be implemented via one-way or two-way communication networks which may include at least one of the following: a satellite communication network; a cable or a CATV (Community Antenna Television) communication network; a conventional terrestrial broadcast television network; a telephone communication network; and a computer based communication network. The computer based communication network may include at least one of the following: the Internet; a wired or wireless local area network (LAN); a wide area network (WAN); and a commercial interactive communication network, such as CompuServe™, and America On Line (AOL)™.

It is appreciated that the entertainment system may also be implemented via one-way or two-way hybrid communication networks, such as combination cable-telephone networks, combination satellite-telephone networks, combination satellite-computer based communication networks, or by any other appropriate means.

Physical links in any of the one-way or two-way networks may be implemented via optical links, conventional telephone links, radio-frequency (RF) wired or wireless links, or any other suitable links.

Preferably, the entertainment system 10 includes a plurality of information providing communication networks 12 which communicate with a plurality of user units. The information providing communication networks preferably include disparate information sources which either provide information to or make information available for the plurality of user units. For simplicity of description, only one user unit 15 is illustrated in FIG. 1. The user unit 15 communicates, for example, with a satellite network 20 and with the World Wide Web (WWW) 26 via the Internet 25 as is well known in the art.

Preferably, the satellite network 20 includes a headend 30 which transmits information to the user unit 15 via a communication satellite 35. The information preferably includes at least one of the following: television programming, preferably including pay television programming; multimedia information; audio programs; data; gaming information; and gaming guide information.

At the user unit 15, the information transmitted from the headend 30 is received at an antenna 40 and is provided via a cable 45 to a user interface unit 50 which prepares the information in a format suitable for display on a display, and provides the information prepared in the suitable format to a display 55. The display 55 may comprise any appropriate display, such as a television or any type of computer monitor. Typically, the user interface unit 50 is operatively associated with the display 55 via a cable 56.

The user interface unit 50 is also preferably operatively associated with the Internet 25 via any appropriate means, such as communication interface equipment (not shown) and a cable or a twisted pair 58 as is well known in the art. Preferably, the user interface unit 50 is operative to receive information from the Internet 25, to process the information in a processor 60 which is preferably comprised in the user interface unit 50, and to provide the information to the display 55 for display thereon. It is appreciated that the information received from the Internet 25 may typically include various types of computer generated information, such as multimedia information, audio programs, data, and gaming information as well gaming guide information.

The user interface 50 may be also operatively associated, via wires 61, with other communication networks, such as a local area network (LAN) 62. It is appreciated that the plurality of information providing communication networks 12 may include the satellite network 20, the Internet 25 and the LAN 62.

Preferably, the user interface unit 50 includes a storage device, which may include either an internal memory (not shown) or an external removable memory 65. The external removable memory 65 may preferably include a memory card, or a memory which is comprised in a smart card. Preferably, the memory 65 is operative to store at least gaming information and gaming guide information. It is appreciated that information stored in the memory 65 may be displayed on the display 55 as is well known in the art.

Preferably, at least a portion of the gaming guide information originating from the various disparate information sources, i.e. the headend 30, the Internet 25 and the memory 65, or from any other related source, may be displayed simultaneously on the display 55. Preferably, the gaming guide information originating from each of the various sources is displayed in a separate region on a screen 57 of the display 55. It is appreciated that at least a portion of the gaming guide information originating from each of the various sources may be individually addressed information, individually addressed to the user interface unit 50.

Alternatively or additionally, the gaming guide information originating from the various sources may be combined to form combined gaming guide information, the combined gaming guide information being preferably displayed on the display 55.

Thus, a viewer 70 may preferably simultaneously see and select games which are available from many information sources in a combined and compact form and on a single menu. Additionally, any operation which may be performed on the gaming guide information may preferably be applied to any game regardless of the game source. It is appreciated that any operation which is performed on the gaming guide information is preferably indicated via a remote control 75 which is preferably operated by the user 70.

Typically, the user unit 15 may also include an appropriate recording unit, such as a VCR 80 which is operatively associated with the user interface unit 50 and the display 55, typically via cables 85 and 90 respectively. It is appreciated that operations performed on the gaming guide information may also include VCR programming operations which enable programming of the VCR 80 to record television programs.

The entertainment system 10 may also include a central gaming facility 100 which may be operatively associated with or comprised in one of the disparate information sources, such as the headend 30. The central gaming facility 100 may be operative to initiate and manage at least one of the games available from at least one of the information sources.

The system of FIG. 1, and particularly the user interface unit 50, may be especially suitable in applications which involve convergence of various types of networks, such as the Internet 25 and a cable TV network, or a cable network and a telephone network. Since in the prior art, each network, if it provides a program guide at all, provides a different type of program guide which shows programs and services available through the one network, program guides from different networks typically have different formats which cannot generally be combined. Thus, the user 70 may typically, in the prior art, operate each program guide separately. However, the user 70 cannot, in the prior art, link the program guides and information provided thereby.

In the system of the present invention different program guides from different networks retain their initial formats. Each program guide may be displayed in a separate location on the display 55, and in each such separate location the program guide is preferably displayed in its original format. However, the different program guides are displayed simultaneously, and access to the different program guides is enabled through a procedure which is operative to unify the different program guides and to enable the user 70 to make selections from each of the different program guides by pointing operations or by pressing keys on the remote control 75. The selections are preferably executed separately on each program guide but substantially at the same time.

A computer program which is operative to carry out the procedure is preferably resident in the processor 60 or in a memory connected thereto, such as the memory 65. Alternatively, the computer program may be transmitted from one of the many information sources.

It is appreciated that the system of the present invention is especially useful with a gaming guide application in which information about games available in many types and through different media is provided. In such a case, the user 70 may be able to view on the display 55, at any specific time, all the games that are available, either through broadcast or from memory, at the specific time.

It is appreciated that except for programs and entertainment, the user 70 may also view at separate locations on the display 55 a wide variety of information, such as readout data from utility meters, and information related to security. Such data may be typically obtained from other networks, such as a security network (not shown).

Reference is now additionally made to FIGS. 2A–2E which are simplified pictorial illustrations of preferred implementations of selection menus in a gaming guide which are generated by the user interface unit 50 and displayed on the display 55, and are operative with the entertainment system 10 of FIG. 1.

The selection menus are preferably associated with gaming guide information provided by or available from a plurality of disparate sources, such as the headend 30 and the World Wide Web. Preferably, selections from the selection menus of FIGS. 2A–2E may be performed via the remote control 75 or a keyboard (not shown).

Figure 2A:
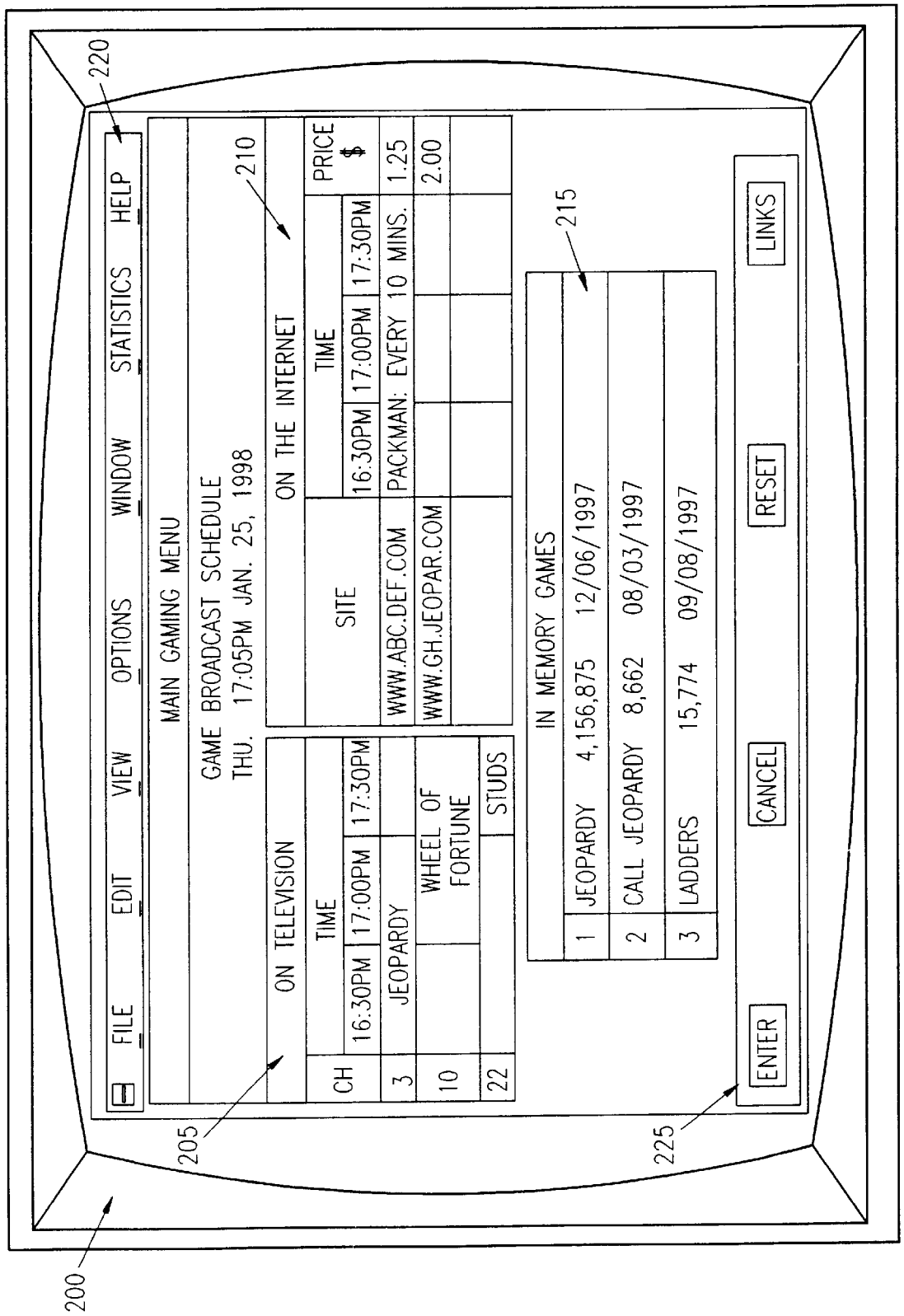
FIGS. 2A–2E are simplified pictorial illustrations of preferred implementations of gaming guide selection menus generated by and displayed at a user unit in the entertainment system of FIG. 1.

Preferably, when the user 70 selects viewing the gaming guide, a main gaming menu 200, such as is illustrated in FIG. 2A, is displayed on the display 55.

The menu 200 is preferably chained and/or linked to additional on-screen menus, such as the menus illustrated in FIGS. 2B–2E. The terms "chain" and "link", taken either separately or in combination in all of their forms, in association with on-screen menus and/or information displayed in the on-screen menus, are used throughout the specification and claims to include dynamic or pre-programmed logical connections between menus. If a series of menus are chained and/or linked, each menu in the series of menus may be accessed from at least some of the menus in the series of menus by operations such as pointing an icon or pressing a key or a series of keys on a keyboard. The series of chained and/or linked menus may typically form part of, be produced by, or be associated with a software program.

Preferably, the menu 200 may be also chained and linked to one or more conventional selection menus, such as conventional browsing menus, conventional television program guide menus, system configuration menus, and conventional Internet related menus.

As mentioned above, connections and links among menus may be carried out by a software program. It is appreciated that the software program may be resident in the processor 60 or may be provided over the air or via cables or wires from the headend 30 or the Internet 25 to the user interface unit 50, or be provided by any other appropriate means. In a preferred embodiment of the present invention a suitable procedure may include data base management software as mentioned below with reference to FIG. 4.

Preferably, the menu 200 may include a plurality of sub-menus on each of which data from a different source of gaming guide information, as mentioned above with reference to FIG. 1, may be displayed. For example, conventional television game show schedule information, which may be part of the gaming guide information, may be displayed in a gaming sub-menu 205 titled appropriately, such as "ON TELEVISION". The television game show schedule information may preferably include information such as a name of a game show, a channel at which the game show is displayed and a time at which the game show is displayed.

Preferably, gaming schedule data provided via the Internet 25 may be displayed on a gaming sub-menu 210 which is preferably located adjacent to the sub-menu 205 and is typically titled appropriately, such as "ON THE INTERNET". The gaming schedule data displayed in the sub-menu 210 may preferably include names of available games and game sites from which the games may be retrieved.

It is appreciated that various data links may be employed for connection to the Internet 25. If a telephone link is employed, the user 70 may dial a number of an Internet Service Provider (not shown) to connect to the Internet 25, and may enter, or otherwise indicate, a site location (URL—Uniform Resource Locator), as is well known in the art, in which the gaming schedule data is found.

If connection to the Internet 25 is provided via the satellite 35, the games and the gaming schedule data may be transmitted to the user interface unit 50 periodically, such as, for example, every 30 minutes. In such a case, transmission times of the games may be also displayed in the sub-menu 210 along with the names of the games and the game sites.

It is appreciated that retrieval of some of the games or participation in some of the games may require payment. In such a case, prices for retrieval or participation in games may be also displayed in the sub-menu 210.

Preferably, the menu 200 may also include a gaming sub-menu 215 in which information regarding games which are stored in one of the memories 120 and 65 is displayed. The sub-menu 215 is typically titled appropriately, such as "IN MEMORY GAMES". The information in the sub-menu 215 may preferably include names of games, dates when the games were stored, and a memory size occupied by each game.

It is appreciated that each of the sub-menus 205, 210 and 215 may include information about different games. Alternatively, the games displayed in the sub-menus 210 and 215 may be related to the games displayed in the sub-menu 205.

Preferably, the menu 200 may also include bars 220 and 225 which enable the user 70 to perform conventional operations such as browsing, editing, searching and scrolling. It is appreciated that the bars 220 and 225 may allow selections and operations similar to those customary in computer software. For example, the bar 220 may be similar to a conventional windows based menu bar as found in the Windows 95™ software by Microsoft® Corporation, and it may provide similar selection and operation options through selection tables.

For example, the user 70 may open a selection table and define various links among the sub-menus 205, 210 and 215 by inputting a keyword which may be common to games displayed in each of the sub-menus 205, 210 and 215. When one of the games having the common keyword is indicated, the other games, having the common keyword, may be highlighted thus indicating a link among the games.

Additionally, the user 70 may point at the word "view" in the bar 220 to open a viewing selection table from which the user 70 may select viewing and/or browsing simultaneously either one or more of the sub-menus 205, 210 and 215. The user 70 may also point at the word "options" to select display characteristics, such as fonts, for display of information in any of the sub-menus 205, 210 and 215.

It is appreciated that the user 70 may employ the bar 225 to execute operations such as canceling of selections, resetting, and entering a command.

It is noted that similar bars may be also employed in each of the menus illustrated in FIGS. 2B–2E.

Figure 2B:
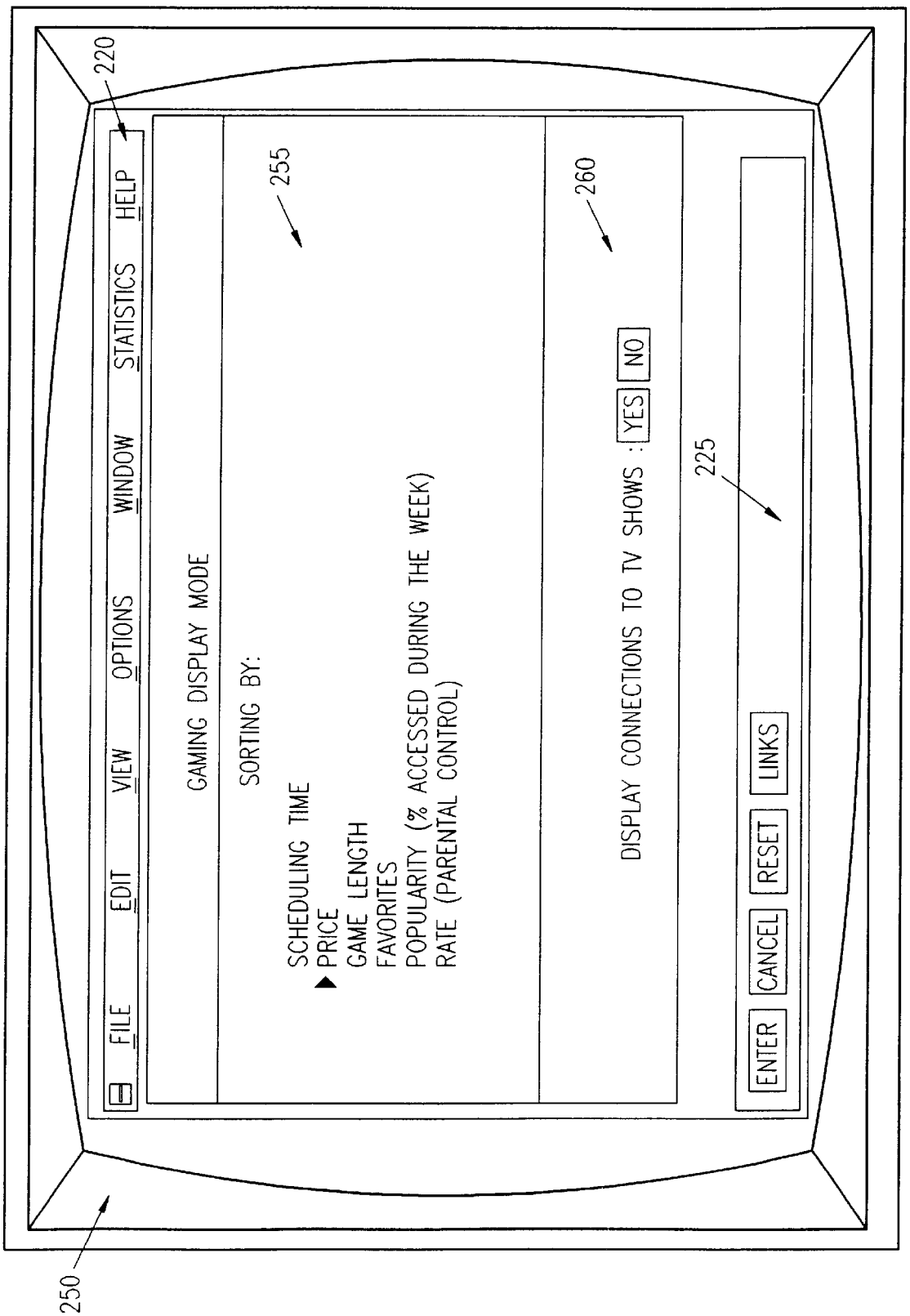

In FIG. 2B, a preferred implementation of a gaming display mode menu 250 is illustrated. The gaming display mode menu 250 is preferably operative with an interactive game in which the user 70 may receive information from and transmit information to the central gaming facility 100 at which the game is played.

The gaming display mode menu 250 may preferably include a submenu 255 which displays sorting options that enable the user 70 to sort the games displayed in each of the sub-menus 205, 210 and 215 by at least one of the following parameters: scheduling time; price; game length; favorites; popularity of a game; and rate.

Preferably, each sorting parameter is associated with a sorting code, and when the user 70 places a selection of a specific parameter, a sorting code associated with the specific parameter is compared to a list of all available sorting codes, and when a match is found the processor 60 sorts the gaming guide information provided by each source in accordance with the selection of the parameter placed by the user 70.

Thus, if, for example, sorting according to favorites is required, the user 70 may point at the "Favorites" field in the menu 250 and press an "Enter" key in the bar 225. The processor 60 then sorts the games according to a previously defined list of favorite games, and when the menu 200 is accessed, the list of previously defined favorite games is displayed on the display 55 before other games.

If sorting according to a popularity of a game is required, the user 70 may select a popularity measurement period by utilizing a "Statistics" key in the bar 220. It is appreciated that if the user 70 does not select a popularity measurement period, a default popularity measurement period may be employed.

Once or before the popularity measurement period is selected, the processor 60 may obtain, from the central gaming facility 100, a statistics identification code determining the number of entries to the game and other statistics identification codes determining the number of entries to other available games during the popularity measurement period. Preferably, the processor 60 processes the respective statistics identification codes and provides an output which enables display of a statistical graph, or other appropriate display, showing a rate of popularity of the game versus the other available games. The statistical graph is preferably displayed in a separate window.

Preferably, the menu 250 also includes a sub-menu 260. The user 70 may preferably employ the sub-menu 260 to select whether to display in the sub-menus 210 and 215 games which are connected to television game shows displayed in the sub-menu 205.

If the user 70 selects to display games connected to television game shows in sub-menus 210 and 215 by entering a "YES", the processor 60 searches for at least one of the following linking parameters: keywords which are common to gaming information displayed in each of the sub-menus 205, 210 and 215; logical links between games provided by the headend 30 or available from the Internet 25 or the memory 65; and rules which commonly apply games provided by the headend 30 or available from the Internet 25 or the memory 65. It is appreciated that any linking parameter which is found is applied to link among corresponding games.

If the user 70 selects not to display games connected to television game shows in sub-menus 210 and 215 by entering a "No", links among games are not applied and gaming information in each of the sub-menus 201, 210 and 215 is processed separately and is displayed without connection to the other sub-menus.

Figure 2C:
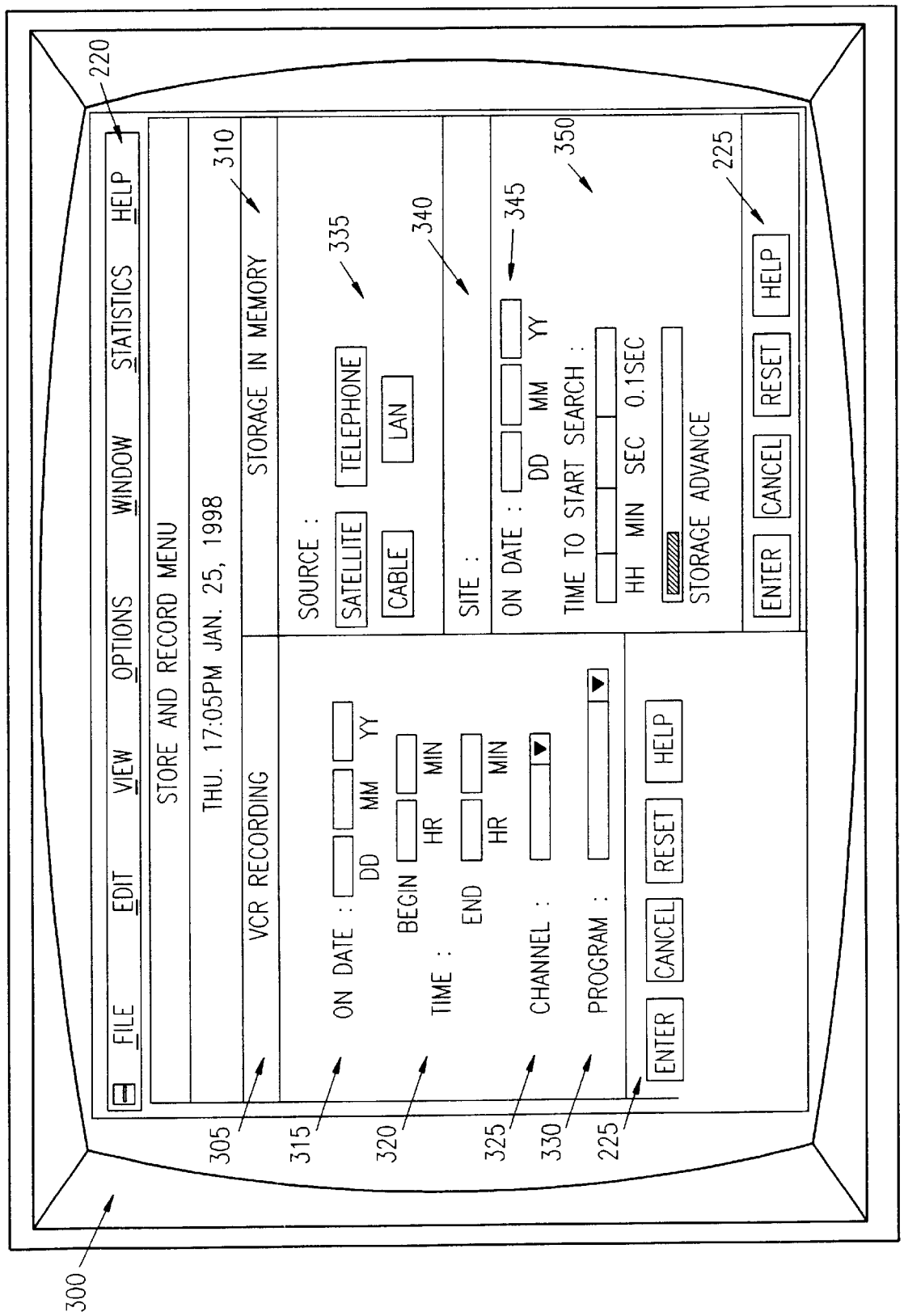

In FIG. 2C, a preferred implementation of a store and record menu 300 is illustrated. The store and record menu 300 is preferably operative with an interactive game in which the user 70 may receive information from and transmit information to the central gaming facility 100 at which the game is played.

Preferably, the store and record menu 300 includes a sub-menu 305 for a video recording, such as by a VCR or any other appropriate recording unit, and a sub-menu 310 for storage of a software gaming program in a memory. It is appreciated that selections in sub-menus 305 and 310 may be performed either separately or in combination.

The video recording may preferably include programming the VCR 80 to record a television program as is well known in the art and described in, for example, the above mentioned U.S. Pat. Nos. 4,977,455 and 5,151,789. In such a case, the sub-menu 305 may preferably include the following fields to enable the user 70 to program the VCR 80: a date field 315, a time field 320 which indicates a time to begin recording and a time to end recording, a channel selection field 325 and a program selection field 330.

The sub-menu 310 preferably includes a set of fields which enable the user 70 to store a requested gaming software program or inputs for a gaming software program for future use. The set of fields typically includes the following fields: a source field 335; a site field 340; a date field 345; and a time field 350. Preferably, inputs entered by the user 70 in the fields 335, 340, 345 and 350 are processed by the processor 60 to determine the requested gaming software program or the inputs for a gaming software program which are to be stored. Then, the processor 60 stores the requested gaming software program or the inputs for a gaming software program in a memory, such as the memory 65.

The source field 335 preferably indicates a source from which the software gaming program is received, such as the satellite 35 and the LAN 62. The site field 340 indicates a URL or an address, such as a WWW site on the Internet 25.

The date and time fields 345 and 350 are preferably used with systems in which data is transmitted periodically, as mentioned above with reference to FIG. 2A. In such a case, the date and time fields 345 and 350 may preferably include a date and a time to start searching for the requested software gaming program in the data which is transmitted periodically.

Figure 2D:
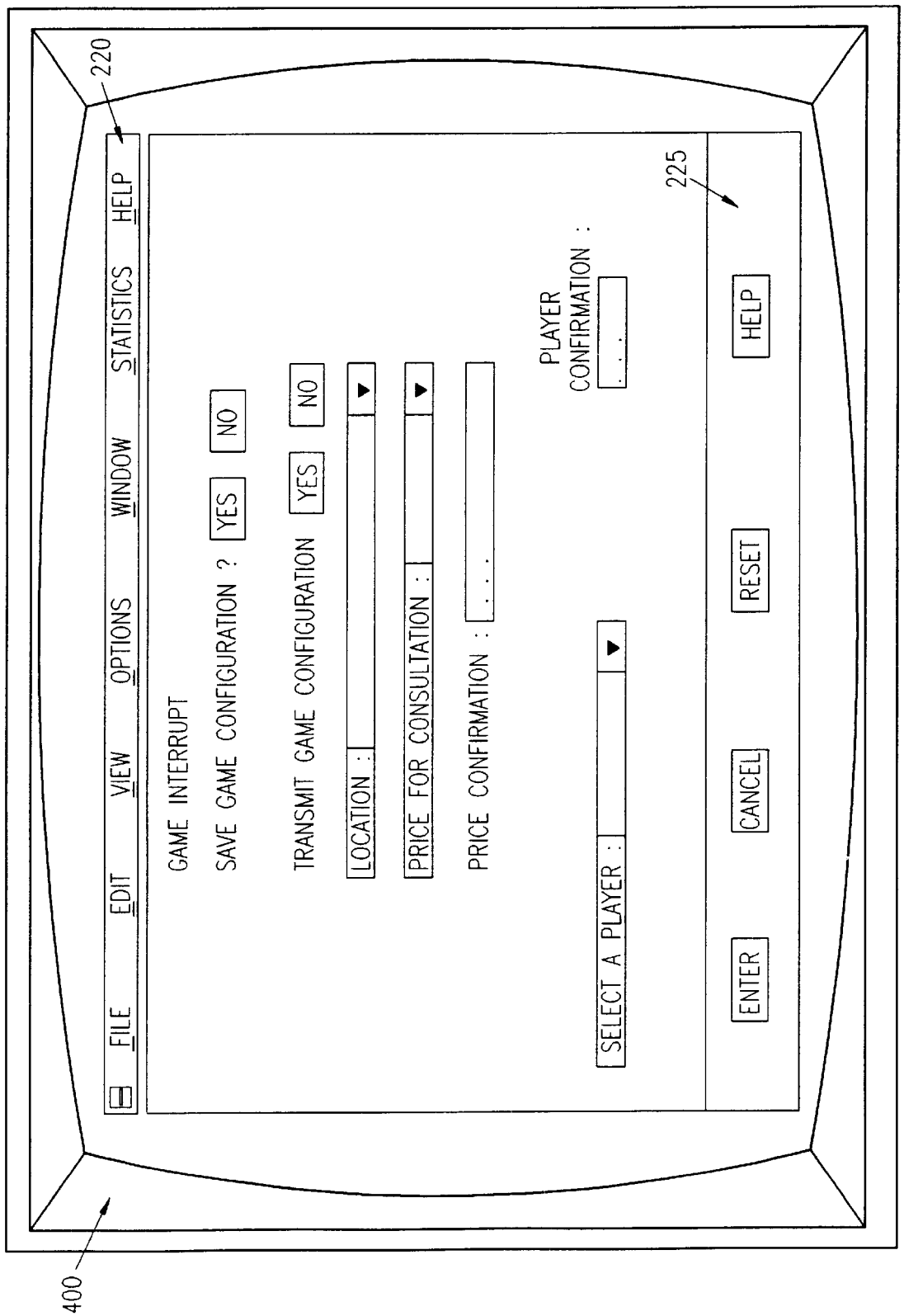

In FIG. 2D, a preferred implementation of a game interrupt menu 400 is illustrated. The game interrupt menu 400 is preferably operative with an interactive game in which the user 70 may receive information from and transmit information to the central gaming facility 100 at which the game is played.

The game interrupt menu 400 is preferably utilized by the user 70 to perform operations on a game which is currently played. Preferably, the operations that may be performed include at least one of the following: saving a game configuration, transmitting a game configuration to a consultant, and selecting a player to play with.

The operation of saving a game configuration may be useful, for example, with games, such as a chess game, in which the user 70 may prefer to interrupt the chess game before winning is determined, and to continue the game at a later date. It is appreciated that in order to continue the game at a later date the user may save a chess game configuration by storing the chess game configuration in a memory, such as the memory 65, and retrieve the chess game configuration from the memory when the game is resumed.

Preferably, when applying the operation of saving a game configuration, the user 70 is invited to enter a name for a file in which the game configuration is to be stored. After the user 70 inputs a name for the file, the game configuration is stored in the file.

It is appreciated that the user 70 may also consider an option of consultation with a consultant which may assist the user 70 in playing the game. In such a case, the user 70 may transmit the chess game configuration to the consultant which may suggest optional moves in the chess game. In order to transmit the chess game configuration to the consultant the user 70 may preferably input a location, i.e. an electronic address of the consultant, and a price for the consultation, and the processor 60 preferably processed and transmits the chess game configuration to the consultant.

The price for the consultation may be preferably determined by the consultant or may be a price offer suggested by the user 70. Alternatively, the price may be offered by bidding. If the price is determined by the consultant, the price may be preferably associated with the location and may be displayed simultaneously with the location.

If the price is suggested by the user 70, the price offer may be associated with a monetary code which is transmitted to the consultant and displayed as a suggested price at a display (not shown) at the location of the consultant. The consultant may transmit a confirmation to the user 70 if the price offer is acceptable.

When applying the operation of selecting a player, the user 70 may browse through a list of players and make a selection of a player to play with. Preferably, the selection of a player generates a message which is transmitted to the player, for example by electronic mail. In order for the selection to be entered, the player preferably transmits a confirmation back to the user 70 by any appropriate means such as, for example, electronic-mail.

It is to be appreciated that in certain games, the user 70 may play a game against a program rather than against a player. In such a case, the user 70 may select the program to play against, and transmit the selection, via electronic-mail to a provider of the program. Preferably, the game may be initiated once the provider of the program transmits a confirmation back to the user 70 by electronic-mail.

Figure 2E:
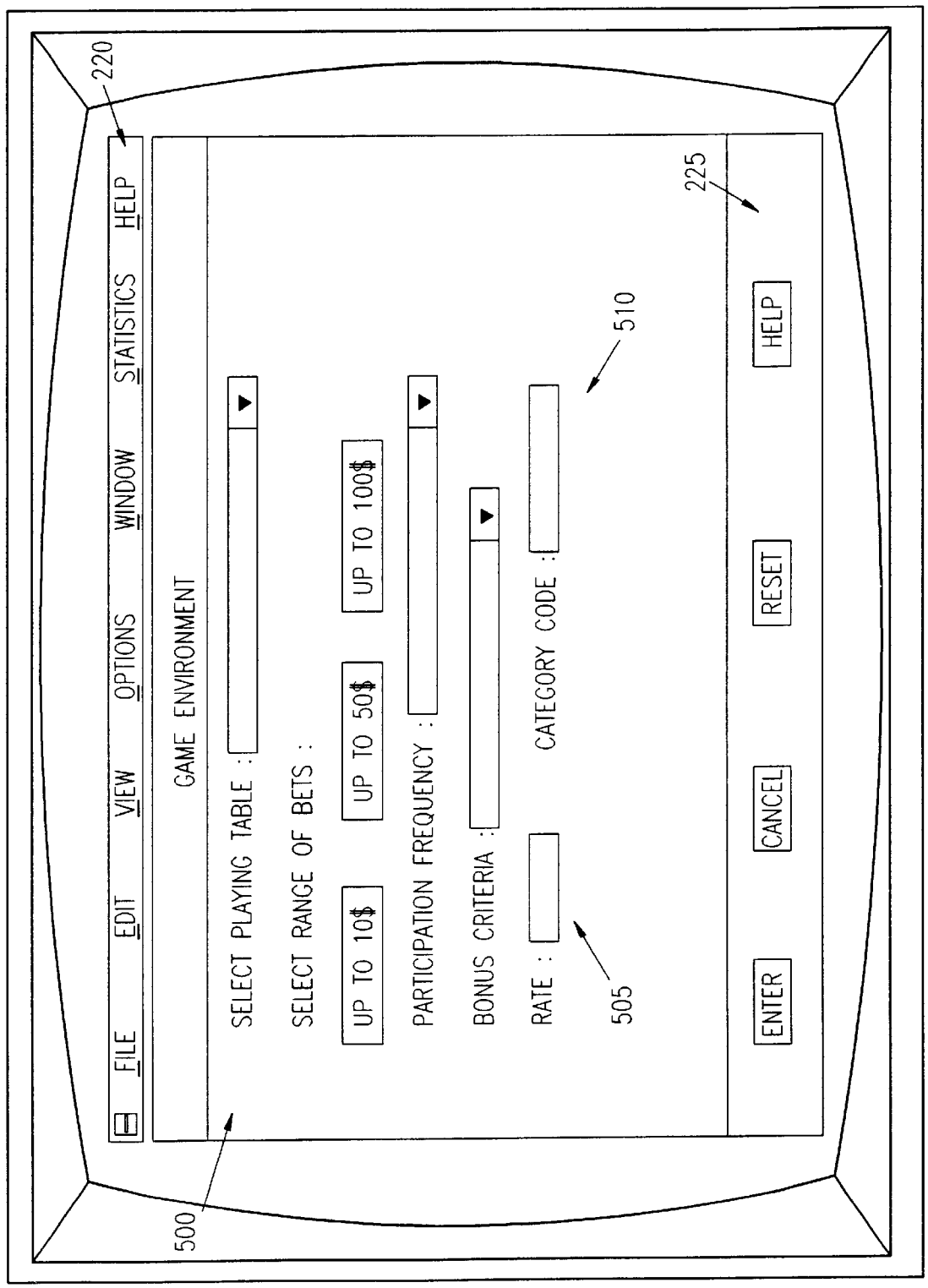

In FIG. 2E, a preferred implementation of a game environment menu 500 is illustrated. The game environment menu 500 is preferably operative with an interactive game in which the user 70 may receive information from and transmit information to the central gaming facility 100 at which the game is played.

Preferably, the game environment menu 500 may be employed in a gaming control method, as described below, which is used for controlling participation of a player, particularly a child, in games.

The menu 500 preferably allows the user 70 to make at least one of the following selections: a playing table selection, a selection of a range of bets, a selection of a participation frequency and a selection of bonus criteria. Furthermore, the user 70 may preferably input a rate for the game according to age groups of his children or accept a rate for the game from the central gaming facility 100. The rate may preferably be one of conventional rates as employed to rate television programs for different audiences.

Alternatively or additionally, the user 70 may also input a game category code which is employed to provide controlled access to the game according to pre-determined categories which may be defined either by the user 70 or by a game provider at the central gaming facility 100. It is appreciated that each category may be a combined category defined according to age groups, prices for participation in games or contents of games, such as violence and sex.

The playing table selection is preferably employed to select one of a plurality of playing tables at which the game is played. Typically, such a selection may be useful in betting applications in which a game, such as a poker game, is played simultaneously at various playing tables. Preferably, the plurality of playing tables are associated with playing table codes which uniquely identify the plurality of playing tables.

When the user 70 selects a requested playing table, a playing table code which is associated with the playing table is preferably transmitted to the central gaming facility 100 where the playing table code is compared to a series of codes which correspond to each of the plurality of playing tables. When a match is found, the user 70 is allowed to participate in the game conducted at the requested playing table if the playing table is not fully loaded.

Preferably, the selection of a range of bets includes a selection of one of a plurality of betting limits, and a selected betting limit may also limit the number of playing tables available for selection since each playing table may have a different betting limit or playing rules.

The selection of a participation frequency and the selection of the bonus criteria may be employed to limit participation of the user 70 in the game. It is appreciated that parental control may be applied by selecting at least some gaming limitations via the menu 500 thus limiting gaming activity of a player, such as a child.

Preferably, the selection of the range of bets, the selection of the participation frequency and the selection of the bonus criteria are associated with a range of bets code, a participation frequency code and a bonus criteria code respectively, and each of these selected codes is preferably transmitted to the central gaming facility 100 where the selected codes are compared to respective series of codes, and limiting parameters are applied in accordance with matches found between the selected codes and codes in the respective series of codes.

Preferably, the rate for the game is determined by a rate code which is associated with the game and is displayed automatically in a rate field 505. If the game is unrestricted, a player, such as a child, may play the game without inputting a game category code in a category code field 510. If the game is restricted, the player is invited to enter a correct game category code in the category code field 510. If the player enters the correct game category code, the game is accessed and enabled. Preferably, the game category code may include a series of characters, such as digits or letters; it is appreciated that characters which are neither digits nor letters may also be used and that using non-digit, not-letter characters may make the game category code harder to guess.

It is appreciated that the user 70 may also enter a new rate for the game by using operations enabled via the bar 220. The new rate may be entered only after the game is accessed by entering an original rate code.

Preferably, all inputs and selections entered in the game environment menu 500 may be combined to form an environment code which is processed, either at the user interface unit 50 or at the central gaming facility 100, and is transmitted to the central gaming facility 100 to control access to the game and to provide the game to the user interface unit 50 under restrictions and conditions defined by the inputs and selections entered in the game environment menu 500.

At the central gaming facility 100, the environment code may preferably be compared, in whole or in part, to a series of environment codes, and the restrictions and conditions are determined when the environment code, or a respective part thereof, matches an environment code in the series of environment codes.

As mentioned above, the central gaming facility 100 may be comprised in the headend 30 or operatively associated thereto. Alternatively or additionally, the central gaming facility 100 may be operatively associated with the Internet 25 or to the LAN 62.

It is appreciated that the above mentioned selections of a playing table, a range of bets, a participation frequency, bonus criteria, a rate and a category code, or a selection of an environment code may be downloaded to a secure microprocessor at the user interface unit 50 rather than being inputted by the user 70.

Typically, a game played or managed at the central gaming facility 100 may be a live game which may be photographed by a video camera and broadcast to the user 70. Alternatively, the game played at the central gaming facility 100 may be computer game software transmitted to the user 70. In any of these cases, inputs provided by the user 70 may be entered automatically via a central gaming computer (not shown) at the central gaming facility 100. If the game is a live game, participants at the central gaming facility 100 may refer to the inputs provided by the user 70, as well as by other users, and act accordingly.

Reference is now additionally made to FIG. 3 which is a simplified block diagram illustration of a preferred implementation of the user interface unit 50 in the entertainment system 10.

Preferably the user interface unit 50 includes an integrated receiver and decoder (IRD) 800 which is operatively associated with the satellite network 20, and a telephone modem 805 which is operatively associated with the Internet 25. As mentioned above, the user interface unit 50 may also include interfaces to other communication networks, such as a network interface 810 which is operatively associated with the LAN 62.

Preferably, the user interface unit 50 also includes the processor 60, and the following units: an internal memory 820; an external memory interface unit 825; and a controller and on-screen display (OSD) 830 which is operatively associated with the display 55. The processor 60 is preferably operatively associated with the following units: the IRD 800; the modem 805; the network interface 810; the memory 820; the external memory interface unit 825; and the controller and OSD 830.

The external memory interface unit 825 is preferably operative to accept the external removable memory 65, and to enable reading from and writing to the external removable memory 65. It is appreciated that the external removable memory 65 may include any one of: a magnetic memory card; a floppy disk; an optical memory card; a compact disk (CD) read/write memory; a CD-ROM (compact disk-read only memory); a PCMCIA type memory card; and any other appropriate memory device.

The user interface unit 50 may also preferably include a smart card reader 835 which is operatively associated with the processor 60. The smart card reader 835 is preferably a conventional smart card reader as is well known in the art. The smart card reader 835 is preferably operative to accept a smart card 840 and to enable reading from and writing to the smart card 840.

The smart card 840 is preferably operative to provide conditional access to at least part of the programming and data provided via the entertainment system 10 by at least one of the satellite network 20, the Internet 25, and the LAN 62 as is well known in the art, such as in U.S. Pat. Nos. 5,282,249 and 5,481,609 to Cohen et al., the disclosures of which are hereby incorporated herein by reference.

It is appreciated that the smart card 840 may include a high capacity memory (not shown). In such a case, the external memory interface unit 825 and the external removable memory 65 may be optional.

Preferably, the processor 60 processes gaming guide information which is provided by at least one of the following sources: the satellite network 20, the Internet 25, the LAN 62 and one of the following: the internal memory 820, the external removable memory 65 and the smart card 840. The processor 60 preferably processes and combines the gaming guide information provided by all the sources to form combined gaming guide information, and provides the combined gaming guide information to the controller and OSD 830 which prepares the combined gaming guide information in a format suitable for display on the display 55. It is appreciated that the gaming guide information from the satellite 20 may be provided to the processor 60 via the IRD 800, the gaming information from the Internet 25 may be provided to the processor 60 via the telephone modem 805, and the gaming guide information from the LAN 62 may be provided to the processor 60 via the network interface 810.

It is further appreciated that at least some non-gaming guide information may be provided to the controller and OSD 830 directly from the telephone modem 805 and from the network interface 810 without processing by the processor 60.

Figure 4:
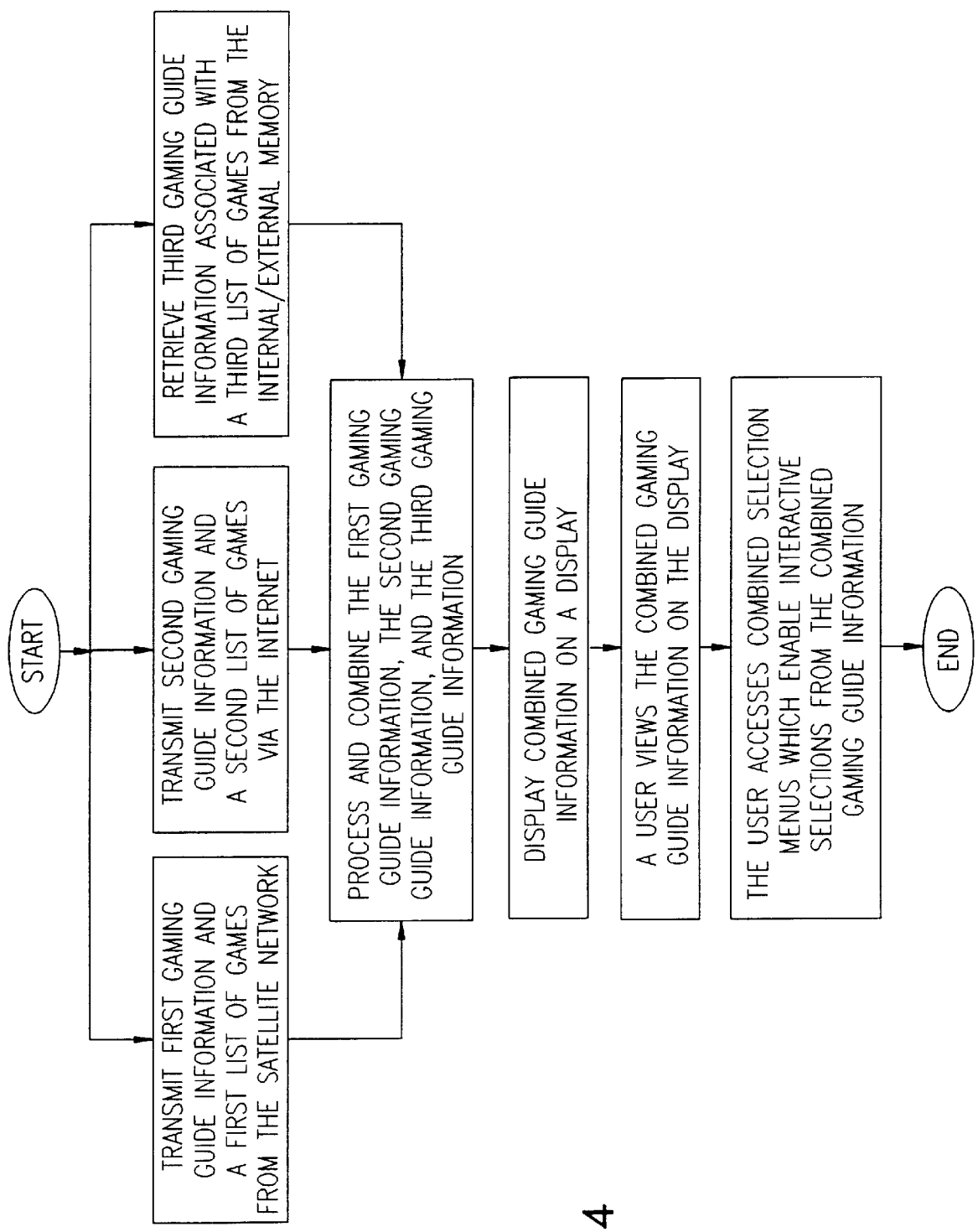
FIG. 4 is a simplified flow chart illustrating a preferred method of operation of the apparatus of FIG. 1.

Reference is now additionally made to FIG. 4 which is a simplified flow chart illustrating a preferred method of operation of the apparatus of FIGS. 1 and 3.

Preferably, first gaming guide information associated with a first list of available games is transmitted from the satellite network 20, and second gaming guide information associated with a second list of available games is transmitted via the Internet 25. Additionally, third gaming guide information associated with a third list of available games may be retrieved from the internal memory 820 or from the external removable memory 65. It is appreciated that the third list of available games may be supplied to the user interface unit 50 via the LAN 62.

Preferably, the first gaming guide information, the second gaming guide information and the third gaming guide information are processed and combined to form combined gaming guide information. The combined gaming guide information is preferably displayed on the display 55, and the user 70 may view the combined gaming guide information on the display 55 and may access combined selection menus to interactively select options from the combined gaming guide information.

It is appreciated that there are many possible methods for combining the first gaming guide information, the second gaming guide information and the third gaming guide information. A preferred method is through use of data base management software, such as the ACCESS™ data base software by Microsoft® Corporation.

In a case where data base management software is used, the first gaming guide information may include a first data base which is prepared and managed at the headend 30, the second gaming guide information may include a second data base which is prepared and managed at an Internet Service Provider location (not shown), and the third gaming guide information may include a third data base which is provided via the LAN 62 and is stored in one of the following memories: the internal memory 820; and the external removable memory 65. Alternatively, each of the first, second and third gaming guide information may include a set of data from which a corresponding data base may be built.

Preferably, the processor 60 combines the first data base, the second data base and the third data base to form a combined data base by using conventional data base management and updating methods, such as insertion of new fields, rearrangement of fields, updating of information in existing fields, addition of items to fields and insertion of new information. If, as mentioned above, sets of data from which the corresponding data bases are built are employed rather than the first, second and third data bases, the processor 60 inserts the data from the corresponding sets of data in a combined data base appropriately.

It is appreciated that any of the first, the second and the third data bases may be a multi-dimensional data base, and the combined data base may be a multi-dimensional data base having more fields than at least one of the first, the second and the third data bases.

The data base management software may be also useful in designing and developing of a man-machine-interface (MMI) for a gaming guide which displays the combined gaming guide information. The MMI preferably enables manipulation of the combined gaming guide information.

If the ACCESS™ data base software by Microsoft® Corporation is employed, the MMI may preferably include a combination of the menus as described above with reference to FIGS. 2A–2E with conventional ACCESS data base manipulation menus. Alternatively, the conventional ACCESS data base manipulation menus may be modified to provide selection options as described in the menus mentioned above with reference to FIGS. 2A–2E.

Preferably, the conventional ACCESS data base manipulation menus allow operations which are customary in data base management software, such as displaying of various data fields, data updating, and retrieval/selection of data.

It is appreciated that use of the ACCESS data base management software may require a powerful processor and a high capacity memory. Thus, if the processor 60 does not provide enough processing power, an additional processor (not shown) may be provided to process the ACCESS data base management software and information related thereto. The additional processor may optionally be a special purpose processor, or a conventional PC (Personal Computer) type processor, such as a Pentium® processor commercially available from multiple vendors. Similarly, If none of the memories 65 and 820 is a high capacity memory, a high capacity memory (not shown in FIG. 3) may be provided to store data base information.

Although the gaming guide described above includes, by way of example, information from three different sources of gaming guide information, it is appreciated that the gaming guide may include information from any appropriate number of gaming guide information sources, and the gaming guide information from all the sources, or some of them, may be combined to form the combined gaming guide information.

In a case where only one source of gaming guide information, such as the headend 30, is available the combined gaming guide information includes only the first gaming guide information. In such a case, only the first gaming guide information is displayed on the display 55, and the user 70 may only view and manipulate information provided by the headend 30. Since in many cases, the antenna 40 is only a receiving antenna which does not provide an uplink to the satellite 35, the user 70 cannot transmit modifications of the first gaming guide information to the headend 30, unless other means are used for the uplink, such as a telephone (not shown) which communicates via a telephone link (not shown) as is well known in the art. It is appreciated that the user 70 may modify locally the information provided by the headend 30.

Although the user 70 preferably cannot modify the first gaming guide information transmitted by the headend 30 in a case where there is no uplink to the headend 30, other types of information manipulation may be performed, such as data field reordering and reordering of lines or columns. The information manipulation may be obtained by employing the processor 60 which may process the first gaming guide information prior to display on the display 55, and may store processed gaming guide information in the memory 820. When the user 70 programs the processor 60 so as to enable viewing the first gaming guide information in a certain requested order, the processed information is retrieved from the memory 820 and displayed on the display 55 to provide the requested order.

If the one source of gaming guide information is an information provider which provides the second gaming guide information to the user 70 via the Internet 25, the user 70 may have ability to view and modify the second gaming guide information. Preferably, modifications of the second gaming guide information may be transmitted back to the information provider via the Internet 25.

The ability to modify the second gaming guide information may be useful, for example, for parental control. Preferably, the user 70 may transmit to the information provider commands which block access to sites which contain information that is not suitable for children, such as sex related sites.

Additionally, the user 70 may modify the second gaming guide information to display only a short, pre-selected list of gaming sites according to preferences defined by the user 70. In such a case, display of gaming sites which are not of interest to the user 70 may be avoided.

If the one source of gaming guide information is one of the memories 820 and 65, the third gaming guide information which is stored in the one of the memories 820 or 65 may be viewed and modified by the user 70 as any piece of stored software data.

It is appreciated that a gaming guide which combines gaming guide information from two or more gaming guide information sources may provide benefits which cannot be obtained when only one source of gaming guide information is available. For example, the gaming guide may provide links among games and game shows provided by a first source, such as the headend 30, games available from a second source, such as the Internet 25, and games available from a third source, such as the memory 820.

Referring back to FIG. 2A, if, for example, the user 70 is interested in a specific type of game, such as a Jeopardy game, the processor 60 may search a set of Internet URLs for URLs which include at least a substantial portion of the word "Jeopardy". Alternatively, any of a wide variety of appropriate searching method, such as methods well-known in the art in the case of WWW searching engines, may be used to find a "Jeopardy"-related URL. If such a URL is found, for example, a URL named "www.gh jeopar.com" as shown in the sub-menu 210, the URL is displayed on the display 55 together with schedule information of a Jeopardy game show, such as, for example, a Jeopardy game show which is scheduled to be broadcast at 16:30 PM on channel 3 as shown in sub-menu 205.

Additionally, the user 70 may also store results of previous Jeopardy games in the memory 820, such as in a file named "CALL JEOPARDY" as shown in the sub-menu 215. It is appreciated that if the memory 820 of FIG. 3 is a high capacity memory, the user 70 may also record and store a full television game show of Jeopardy in a file named "Jeopardy", as also shown in the sub-menu 215.

It is appreciated that the processor 60 may also search the files stored in the memory 820 of FIG. 3 for a set of files which include at least a substantial portion of the word "Jeopardy" in their title or text. If such files are found, for example, the files named "JEOPARDY" and "CALL JEOPARDY" as shown in the sub-menu 215, the files are displayed on the display 55 together with the URL "www.gh.jeopar.com" and the schedule information of the Jeopardy game show which is scheduled to be broadcast on channel 3.

Thus, the information related to the Jeopardy game which is available from the first, second and third sources is preferably displayed simultaneously on the display 55 at the appropriate sub-menus. Preferably, the processor 60 may mark the information related to the Jeopardy game, such as by highlighting relevant parts of the information, or by insertion of marks near the relevant parts of the information.

Preferably, the links among the games are determined and made by the processor 60 at the user interface unit 50. When the user 70 browses through the sub-menu 205 and views a list of game shows provided by the headend 30, the information displayed in the sub-menus 210 and 215 preferably changes so that games from the Internet 25 and games stored in the memory 820 of FIG. 3, which are linked to the game shows currently being displayed, are displayed simultaneously with the list of game shows. It is appreciated that similarly, browsing through a list of games in the sub-menu 210 may effect display in the sub-menus 205 and 215 of a list of linked game shows and a list of linked games stored in the memory 820 of FIG. 3 respectively. Additionally or alternatively, browsing through a list of games in the sub-menu 215 may effect display in the sub-menus 205 and 210 of a list of linked game shows and a list of linked games from the Internet 25 respectively. Thus, operations performed by the user 70 in one of the three sub-menus 205, 210 and 215 may affect the other two sub-menus.

Preferably, the processor 60 determines and makes the links among games by keywords. Thus, in the example in which a user is interested in the Jeopardy game, the user may preferably indicate his interest in the Jeopardy game by inputting preferences via the remote control 75, or by selecting the Jeopardy game as a favorite game. The processor 60 preferably performs a search based on an appropriate set of parameters, typically parameters common to one or more games, or employs a searching method which is typically used in World Wide Web search engines, as is well known in the art, to process as many games as possible, preferably every game, available from as many sources as possible, preferably every source, and to link all the games found according to the principles of the searching method.

Another preferred method of linking among games is by using logical connections. For example, the processor 60 may offer gambling options and betting games in accordance with spending history of the user 70 or gaming activity of the user 70. Preferably, if the user 70 spends more than a pre-determined sum of money per month on pay television game shows, the processor 60 may offer the user 70 to participate in Internet betting games. Additionally, the processor 60 may offer the user 70 to trade prizes accumulated by participation in an Internet game for free viewing of a pay television game show.

The links among the games may be also employed for parental control. Typically, when the user 70 restricts viewing of or participation in a game available via the Internet 25, the processor 60 may search for games having similar contents, such as sex, and restrict viewing of and participation in games having the word sex in their titles or in their text. It is appreciated that the parental control may be applied according to any appropriate parental control method as used in the Internet.

Alternatively or additionally, the user 70 may employ rules to restrict a game. Preferably, such rules may include a selected time when the game is broadcast and a selected price for the game. In such a case, the processor 60 may restrict viewing of and participation in any game that is broadcast at or after the selected time, and any game which price exceeds the selected price respectively.

Additionally, an invitation to play in a game conducted via the Internet 25 may be displayed while the user 70 watches a television game show, and vice versa. Preferably, the user 70 may either accept the invitation and join the game by acknowledging the invitation, or the invitation may be removed if the user 70 does not respond in a predetermined time period, such as in 15 seconds.

Preferably, many conditional access operations may be performed at the smart card 840 rather than at the central gaming facility 100. For example, the smart card 840 may store the environment code and lists of available environment codes which determine, for a game, access restrictions and conditions, and when the environment code matches one of the available environment codes, the smart card 840 may communicate with the central gaming facility 100 and transmit a confirmation signal enabling the user 70 to play the game.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable sub-combination.

It will be appreciated by persons skilled in the art that the present invention is not limited by what has been particularly shown and described herein above. Rather the scope of the present invention is defined by the claims that follow.

What is claimed is:

1. A gaming guide method comprising:
   providing first gaming guide information from a television network and second gaming guide information from a computer based communication network;
   displaying simultaneously at least a portion of said first gaming guide information and at least a portion of said second gaming guide information in a store-and-record menu; and
   enabling a user to perform at least one operation in said store-and-record menu to obtain a result comprising both of the following: recording information received from the television network; and storing information received from the computer based communication network.

2. A method according to claim 1 and wherein said displaying also comprises:
   displaying the at least a portion of said first gaming guide information and the at least a portion of said second gaming guide information in separate regions on a display.

3. A method according to claim 1 and wherein said computer based communication network includes at least one of the following: the Internet; a local area network (LAN); a wide area network (WAN); and a commercial interactive communication network.

4. A method according claim 1 and also comprising combining said at least a portion of said first gaming guide information and said at least a portion of said second gaming guide information to form combined gaming guide information prior to said displaying, and wherein
   said displaying comprises displaying said combined gaming guide information.

5. A method according to claim 1 and also comprising retrieving third gaming guide information from a storage device, and wherein said displaying comprises:
   displaying simultaneously said at least a portion of said first gaming guide information, said at least a portion of said second gaming guide information and at least a portion of said third gaming guide information in said store-and-record menu, and said result also comprises:
   storing at least some of the information retrieved from the storage device.

6. A method according to claim 5 and also comprising:
   performing a selection from said at least a portion of said first gaming guide information, from said at least a portion of said second gaming guide information, and from said at least a portion of said third gaming guide information.

7. A method according to claim 5 wherein said first gaming guide information includes a first list of available games, said second guide information includes a second list of available games and said third guide information includes a third list of available games, and
   said displaying comprises displaying the first list of available games, the second list of available games and the third list of available games in said store-and-record menu.

8. A method according to claim 7 and comprising marking at least one favorite game from at least one of the first list, the second list, and the third list.

9. A method according to claim 1 and also comprising:
   performing a selection from said at least a portion of said first gaming guide information and from said at least a portion of said second gaming guide information.

10. A gaming guide method comprising:
    providing database management software;
    providing first gaming guide information from a television network and second gaming guide information from a computer based communication network, the first gaming guide information and the second gaming guide information each being provided in a format acceptable as input by the database management software; and
    employing the database management software to combine said first gaming guide information and said second gaming guide information into a combined gaming guide database, and to handle interactions between a user and the combined gaming guide database which enable the user to perform at least one operation to obtain a result comprising both of the following: recording information received from the television network; and storing information received from the computer based communication network.

11. A gaming guide method comprising:
    providing to a user interface unit first gaming guide information from a television network and second gaming guide information from a computer based communication network;

linking at least a portion of said first gaming guide information to at least a portion of said second gaming guide information thereby forming combined gaming guide information; and performing at least one operation on said combined gaming guide information via a combined menu to obtain a result comprising both of the following: recording information received at the user interface unit from the television network; and storing information received at the user interface unit from the computer based communication network.

12. A method according to claim 11 and wherein the linking comprises linking at least a portion of said first gaming guide information to at least a portion of said second gaming guide information according to at least one of the following: a keyword; a logical connection; and a rule.

13. A method according to claim 12 and wherein at least one of said keyword, said logical connection and said rule is pre-determined.

14. A method according to claim 11 and also comprising retrieving third gaming guide information from a memory, and wherein said linking comprises:

linking at least a portion of said third gaming guide information to said combined gaming guide information.

15. A method according to claim 14 and wherein said linking at least a portion of said third gaming guide information to said combined gaming guide information comprises linking at least a portion of said third gaming guide information to at least one of said at least a portion of said first gaming guide information and at said least a portion of said second gaming guide information according to at least one of the following: a keyword; a logical connection; and a rule.

16. A method according to claim 15 and wherein at least one of said keyword, said logical connection and said rule is pre-determined.

17. A method according to claim 14 and also comprising:

displaying said at least a portion of said third gaming guide information when said at least a portion of said first gaming guide information and said at least a portion of said second gaming guide information are displayed.

18. A method according to claim 14 and also comprising:

displaying said at least a portion of said first gaming guide information and said at least a portion of said second gaming guide information when said at least a portion of said third gaming guide information is displayed.

19. A method according to claim 11 and also comprising:

displaying said at least a portion of said second gaming guide information when said at least a portion of said first gaming guide information is displayed.

20. A method according to claim 11 and also comprising:

displaying said at least a portion of said first gaming guide information when said at least a portion of said second gaming guide information is displayed.

21. A user unit in a gaming guide system in which first gaming guide information is transmitted to the user unit from a television network and second gaming guide information is transmitted to the user unit from a computer based communication network, the user unit comprising:

a user interface unit operative to perform the following:
receive said first gaming guide information from the television network and said second gaming guide information from the computer based communication network, prepare said first gaming guide information together with said second gaming guide information in a format suitable for displaying simultaneously at least a portion of said first gaming guide information and at least a portion of said second gaming guide information in a store-and-record menu, and enable a user to perform at least one operation in the store-and-record menu to obtain a result comprising both of the following: recording information received from the television network; and storing information received from the computer based communication network; and a display operatively associated with said user interface unit and operative to display information received from the user interface unit.

22. Apparatus according to claim 21 wherein said user interface unit is also operative to prepare said first gaming guide information and said second gaming guide information in a format suitable for displaying simultaneously said at least a portion of said first gaming guide information and said at least a portion of said second gaming guide information in separate regions on said display.

23. Apparatus according to claim 21 and wherein said user interface unit also comprises a memory, the memory includes third gaming guide information, and said user interface unit is also operative to prepare at least a portion of said third gaming guide information in a format suitable for displaying together in said store-and-record menu said at least a portion of said first gaming guide information, said at least a portion of said second gaming guide information, and said at least a portion of said third gaming guide information.

24. A gaming guide system comprising:

a television network;

a computer based communication network; and a multiplicity of user units, each user unit comprising:
a user interface unit operative to perform the following:
receive first gaming guide information from the television network and second gaming guide information from the computer based communication network, prepare said first gaming guide information together with said second gaming guide information in a format suitable for displaying simultaneously at least a portion of said first gaming guide information and at least a portion of said second gaming guide information in a store-and-record menu, and enable a user to perform at least one operation in the store-and-record menu to obtain a result comprising both of the following: recording information received from the television network; and storing information received from the computer based communication network; and a display operatively associated with said user interface unit and operative to display information received from the user interface unit.

25. A gaming guide method comprising:

providing from a television network first gaming guide information which includes a first list of games and from a computer based communication network second gaming guide information which includes a second list of games;

simultaneously displaying said first list and said second list in a combined menu;

choosing one of said first list and said second list;

marking at least one favorite game in the chosen one of said first list and said second list; and marking at least one favorite game in the non-chosen one of said first list and said second list in response to marking of said at least one favorite game in said chosen list.

26. A gaming guide method comprising:

providing from a television network first gaming guide information which includes a first list of games and from a computer based communication network second gaming guide information which includes a second list of games;

linking at least a portion of said first gaming guide information to at least a portion of said second gaming guide information thereby forming combined gaming guide information that includes a combined list of games combining games from the first list with games from the second list; and determining a popularity of a game in the combined list of games during a popularity measurement period with respect to other games in the combined list of games.

27. A gaming guide method comprising:

providing first gaming guide information from a television network and second gaming guide information from a computer based communication network;

linking at least a portion of said first gaming guide information to at least a portion of said second gaming guide information thereby forming a combined game guide; and offering, via the combined game guide, at least one option to participate in a game referred to in said first gaming guide information based upon participation in a game referred to in said second gaming guide information.

28. The method according to claim 27 and wherein said participation in a game referred to in said second gaming guide information comprises at least one of the following: gaming activity of a user; and spending history of a user.

29. The method according to claim 27 and wherein said offering comprises offering a user to trade prizes accumulated by participation in a game referred to in said second gaming guide information for participation in a game referred to in said first gaming guide information.

30. A user unit in a gaming guide system in which first gaming guide information which includes a first list of games is transmitted to the user unit from a television network and second- gaming guide information which includes a second list of games is transmitted to the user unit from a computer based communication network, the user unit comprising:

a user interface unit operative to perform the following:
  receive said first gaming guide information from the television network and said second gaming guide information from the computer based communication network,
  prepare said first gaming guide information together with said second gaming guide information in a format suitable for simultaneously displaying said first list and said second list in a combined menu,
  choose one of said first list and said second list,
  mark at least one favorite game in the chosen one of said first list and said second list, and
  mark at least one favorite game in the non-chosen one of said first list and said second list in response to marking of said at least one favorite game in said chosen list; and a display operatively associated with said user interface unit and operative to display information received from the user interface unit including marked information.

31. A user unit in a gaming guide system in which first gaming guide information which includes a first list of games is transmitted to the user unit from a television network and second gaming guide information which includes a second list of games is transmitted to the user unit from a computer based communication network, the user unit comprising:

a user interface unit operative perform the following:
  receive said first gaming guide information from the television network and said second gaming guide information from the computer based communication network,
  link at least a portion of said first gaming guide information to at least a portion of said second gaming guide information thereby forming combined gaming guide information that includes a combined list of games combining games from the first list with games from the second list, and
  determine a popularity of a game in the combined list of games during a popularity measurement period with respect to other games in the combined list of games; and a display operatively associated with said user interface unit and operative to display information received from the user interface unit including a determination of the popularity of the game.

32. A user unit in a gaming guide system in which first gaming guide information is transmitted to the user unit from a television network and second gaming guide information is transmitted to the user unit from a computer based communication network, the user unit comprising:

a user interface unit operative to perform the following:
  receive said first gaming guide information from the television network and said second gaming guide information from the computer based communication network,
  link at least a portion of said first gaming guide information to at least a portion of said second gaming guide information thereby forming a combined game guide, and
  generate, via the combined game guide, at least one offer to participate in a game referred to in said first gaming guide information based upon participation in a game referred to in said second gaming guide information; and a display operatively associated with said user interface unit and operative to display information received from the user interface unit including said at least one offer to participate in said game referred to in said first gaming guide information.

* * * * *